(12) United States Patent
Tanaka et al.

(10) Patent No.: US 7,544,314 B2
(45) Date of Patent: Jun. 9, 2009

(54) GLASS COMPOSITION FOR THICK FILM RESISTOR PASTE, THICK FILM RESISTOR PASTE, THICK-FILM RESISTOR, AND ELECTRONIC DEVICE

(75) Inventors: Hirobumi Tanaka, Tokyo (JP); Katsuhiko Igarashi, Tokyo (JP)

(73) Assignee: TDK Corporation, Tokyo (JP)

( * ) Notice: Subject to any disclaimer, the term of this patent is extended or adjusted under 35 U.S.C. 154(b) by 8 days.

(21) Appl. No.: 11/213,797

(22) Filed: Aug. 30, 2005

(65) Prior Publication Data

US 2006/0043348 A1 Mar. 2, 2006

(30) Foreign Application Priority Data

Sep. 1, 2004 (JP) ............... 2004-254185
Mar. 1, 2005 (JP) ............... 2005-056637

(51) Int. Cl.
*H01B 1/00* (2006.01)
(52) U.S. Cl. .................... 252/518.1; 252/514
(58) Field of Classification Search ........... 252/500, 252/514, 518.1
See application file for complete search history.

(56) References Cited

U.S. PATENT DOCUMENTS 5,202,292 A 4/1993 Tanabe et al.
5,264,272 A 11/1993 Tanabe et al.
5,491,118 A 2/1996 Hormadaly
6,428,914 B2 * 8/2002 Nagano et al. .............. 313/509
2007/0018776 A1 1/2007 Tanaka et al.

FOREIGN PATENT DOCUMENTS

| EP | 0 718 855 A2 | 6/1996 |
| JP | A 55-130101 | 10/1980 |
| JP | A 63-313802 | 12/1988 |
| JP | 01-120001 A | 5/1989 |
| JP | A 3-131545 | 6/1991 |
| JP | A-3-150234 | 6/1991 |
| JP | 2003-197405 | * 7/2003 |
| JP | A 2003-197405 | 7/2003 |
| TW | 594804 | 6/2004 |

\* cited by examiner

*Primary Examiner*—Mark Kopec
*Assistant Examiner*—Jaison P Thomas
(74) *Attorney, Agent, or Firm*—Oliff & Berridge, PLC

(57) ABSTRACT

A glass composition for a thick-film resistor including at least one oxide selected from CaO, SrO, and BaO in an amount of 13 mol % to 45 mol %, $B_2O_3$ in 0 to 40 mol % (however, not including 0), $SiO_2$ in 17 mol % to 72 mol % (however, not including 72 mol %), $ZrO_2$ in 0 to 10 mol % (however, not including 0), and at least one oxide selected from $Ta_2O_5$ and $Nb_2O_5$ in 0 to 10 mol % (however, not including 0), a thick-film resistor paste obtained by mixing this glass composition with a conductive material and organic vehicle, a thick-film resistor obtained by printing and firing this paste and thereby being lead-free, superior in TCR and STOL, and high in resistance, and an electronic device having this thick-film resistor.

7 Claims, No Drawings

GLASS COMPOSITION FOR THICK FILM RESISTOR PASTE, THICK FILM RESISTOR PASTE, THICK-FILM RESISTOR, AND ELECTRONIC DEVICE

BACKGROUND OF THE INVENTION

1. Field of the Invention

The present invention relates to a glass composition for a thick-film resistor paste suitable for use for forming a thick-film resistor having a high resistance, a thick-film resistor paste using this glass composition, a thick-film resistor, and an electronic device.

2. Description of the Related Art

A resistor paste is generally mainly comprised of a glass composition, a conductive material, and an organic vehicle. The glass composition is included for adjusting the resistance value and having adhesion. The resistor paste is printed on a substrate, then fired to form a thick-film (5 to 20 μm) resistor. This type of resistor paste (thick-film resistor) usually contains ruthenium oxide ($RuO_2$) or a lead-ruthenium oxide as a conductive material and lead oxide (PbO)-based glass as the glass material and therefore is a leaded paste.

In recent years, environmental issues have become hotly debated. Efforts are being made to eliminate lead and other harmful substances from electronic devices. Resistor pastes and thick-film resistors are no exception. Research is now being conducted to make them lead free.

One of the issues in making resistor paste lead-free is achieving both a good temperature characteristic (TCR) and short time overload characteristic (STOL) in a resistor paste with a high resistance (1 kΩ/□ or more). For example, if applying the practice of adjustment of the TCR by addition of a metal oxide as used in conventional lead-based resistor pastes as it is to lead-free compositions, the fluctuation in the resistance value due to application of voltage will become greater than with lead-based compositions, so realizing both good TCR and STOL will be difficult.

In view of this situation, attempts have been made to achieve both a good temperature characteristic (TCR) and short time overload characteristic (STOL) by a resistor paste mainly comprised of a lead-free glass composition, lead-free conductive material, and organic vehicle containing $CaTiO_3$ or NiO as an additive.

For example, Japanese Patent Publication (A) No. 2003-197405 describes that it is preferable to introduce into a resistor paste for example $CaTiO_3$ in an amount of over 0 vol % to not more than 13 vol % or NiO in an amount of over 0 vol % to not more than 12 vol %, more preferable to simultaneously add CuO, ZnO, MgO, and other additives. Japanese Patent Publication (A) No. 2003-197405 describes that by simultaneously adding these additives, it is possible to provide a lead-free resistor paste suitable for obtaining a resistor having a high resistance value, but having a small temperature characteristic of the resistance value (TCR) and short time overload characteristic (STOL).

However, in a resistor formed using a resistor paste adjusted in TCR by introducing a large amount of additives like in the invention described in Japanese Patent Publication (A) No. 2003-197405, the STOL tends to fall more compared with the case of using a resistor paste of a conventional lead-based composition. Therefore, it is believed that if it were possible to further improve the STOL characteristic in a resistor formed using a resistor paste of a composition with no addition of any additives, that is, comprised of just a glass composition and conductive material, it would be possible to avoid the drop in the STOL characteristic.

Further, Japanese Patent Publication (A) No. 2003-197405 does indeed show improvements in the TCR and STOL and also discloses samples with a TCR within ±100 ppm and a STOL close to zero. However, sufficiently good values of both TCR and STOL are only obtained in extremely limited compositions. In the majority of compositions, the STOL is a value of 1% or more even if small. If compositions giving sufficiently good values of both TCR and STOL are limited in this way, for example, the freedom of other characteristics is also limited and problems are liable to occur in the design of the resistor paste, so more improvement is desired.

SUMMARY OF THE INVENTION

The present invention was made in view of this situation and has as its object the provision of a glass composition for a thick-film resistor paste enabling for example a high resistance value of 1 kΩ/□ or more yet realization of good values of both the temperature characteristic (TCR) and short time overload characteristic (STOL) and enabling small values of the TCR and STOL over a wide range of compositions. Further, the present invention has as its object the provision of a thick-film resistor paste high in resistance and superior in temperature characteristic (TCR) and short time overload characteristic (STOL) and further superior in thermal stability by the use of the glass composition for a thick-film resistor paste, a thick-film resistor fabricated using this thick-film resistor paste, and an electronic device having this thick-film resistor.

The inventors engaged in intensive research over a long period of time to achieve the above-mentioned objects. As a result, they discovered that the TCR and STOL could be greatly improved by reevaluating the formulation of the glass composition used in the thick-film resistor paste.

The present invention was completed based on this discovery. That is, according to a first aspect of the present invention, there is provided a glass composition for a thick-film resistor paste comprising at least one oxide selected from CaO, SrO, and BaO in an amount of 13 mol % to 45 mol %, $B_2O_3$ in 0 to 40 mol % (however, not including 0), $SiO_2$ in 17 mol % to 72 mol % (however, not including 72 mol %), $ZrO_2$ in 0 to 10 mol % (however, not including 0), and at least one oxide selected from $Ta_2O_5$ and $Nb_2O_5$ in 0 to 10 mol % (however, not including 0).

According to a second aspect of the present invention, there is provided a thick-film resistor paste including at least a glass composition and a conductive material with which an organic vehicle is mixed, the glass composition comprising at least one oxide selected from CaO, SrO, and BaO in an amount of 13 mol % to 45 mol %, $B_2O_3$ in 0 to 40 mol % (however, not including 0), $SiO_2$ in 17 mol % to 72 mol % (however, not including 72 mol %), $ZrO_2$ in 0 to 10 mol % (however, not including 0), and at least one oxide selected from $Ta_2O_5$ and $Nb_2O_5$ in 0 to 10 mol % (however, not including 0).

According to a third aspect of the present invention, there is provided a thick-film resistor formed using the thick-film resistor paste. According to a fourth aspect of the present invention, there is provided an electronic device having such a thick-film resistor.

The glass composition for a thick-film resistor of the present invention is better in TCR characteristic and STOL characteristic compared with glass compositions of conventional formulations. Therefore, by using this glass composition as the glass composition of a thick-film resistor paste, the superior characteristic is realized of a high resistance value of for example 10 kΩ or more while realizing a TCR of within ±150 ppm (preferably a TCR of within ±100 ppm) and a STOL of within ±1.0% (preferably a STOL of within ±0.5%) in a wide range of formulations.

Note that it is believed that the glass composition does not contain the oxides in their original form, but contains them in for example the form of composite oxides. However, in this specification, the formulation of the glass composition is indicated in accordance with common practice by the contents converted to oxides. For example, the glass composition contained in the thick-film resistor paste or thick-film resistor strictly speaking does not contain Ca in the form of CaO. Further, a Ca material is usually added to a formulation in the form of $CaCO_3$. Therefore, "CaO in 20 to 40 mol %" means the composite oxides forming the glass composition contain Ca in an amount, converted to CaO, of 20 to 40 mol %.

According to the present invention, it is possible to realize a high reliability thick-film resistor having a high resistance value of for example 1 kΩ/☐ or more and achieving both a good TCR characteristic and STOL characteristic and possible to provide a superior quality electronic device. Further, according to the present invention, the obtained thick-film resistor can reliably be given a small TCR and STOL regardless of its formulation.

DESCRIPTION OF THE PREFERRED EMBODIMENTS

Below, the glass composition for a thick-film resistor paste according to the present invention and the thick-film resistor paste, thick-film resistor, and electronic device using the same will be explained.

First, the glass composition for a thick-film resistor paste of the present invention is a glass composition substantially free of lead for protection of the environment. Note that in the present invention, "substantially free of lead" means not containing any lead above the level of an impurity. The level of an impurity (for example, a content in the glass composition of 0.05 wt % or less) may be contained. Lead is sometimes contained in extremely small amounts as an unavoidable impurity.

Further, the glass composition for a thick-film resistor paste of the present invention contains at least one oxide selected from CaO, SrO, and BaO as a main modifier oxide ingredient, $B_2O_3$ and $SiO_2$ as former oxide ingredients, $ZrO_2$ as a second modifier oxide ingredient, and at least one of $Ta_2O_5$ and $Nb_2O_5$ as a third modifier oxide ingredient. There is great significance in the combination of these ingredients.

Here, explaining the contents of the ingredients in the glass composition, first, the main modifier oxide ingredient is preferably contained in the glass composition in an amount of 13 mol % to 45 mol %. If the content of the main modifier oxide ingredient is less than this range, the reactivity with the conductive material drops and the TCR and STOL characteristics are liable to be degraded. Conversely, if the content of the main modifier oxide ingredient is over this range, when forming a thick-film resistor, excessive precipitation of the metal oxide occurs and the characteristics are liable to be degraded and the reliability lowered.

A former oxide ingredient constituted by the $B_2O_3$ is preferably contained in the glass composition in an amount of 0 to 40 mol % (however, not including 0). Further, a former oxide ingredient constituted by $SiO_2$ is preferably contained in the glass composition in an amount of 17 mol % to 72 mol % (however, not including 72 mol %). If the content of the former oxide ingredient is too small, the softening point of the glass composition becomes higher, so when forming a thick-film resistor at a predetermined firing temperature, the sintering of the thick-film resistor becomes insufficient and the reliability is liable to be remarkably reduced. Conversely, if the content of the former oxide ingredient is too great, the water-proofness of the glass composition falls, so the reliability as a thick-film resistor is liable to be remarkably reduced.

The second modifier oxide ingredient is preferably contained in the glass composition in an amount of 0 to 10 mol % (however, not including 0). If the content of the second modifier oxide ingredient is over 10 mol %, when forming a thick-film resistor, excessive precipitation of the metal oxide occurs and the characteristics are liable to be degraded and the reliability lowered.

The glass composition of the present invention has as a major feature including, in addition to the above ingredients, a third modifier oxide ingredient (at least one oxide selected from $Ta_2O_5$ and $Nb_2O_5$). This third modifier oxide ingredient is preferably contained in the glass composition in an amount of 0 mol % to 10 mol % (however, not including 0 mol %). If the third modifier oxide ingredient is not included at all or the content of the third modifier oxide ingredient is above this range, both TCR and STOL become greater and are thereby degraded.

Therefore, the glass composition for a thick-film resistor paste of the present invention may be comprised of at least one oxide selected from CaO, SrO, and BaO in an amount of 13 mol % to 45 mol %, $B_2O_3$ in 0 to 40 mol % (however, not including 0), $SiO_2$ in 17 mol % to 72 mol % (however, not including 72 mol %), $ZrO_2$ in 0 to 10 mol % (however, not including 0), and at least one oxide selected from $Ta_2O_5$ and $Nb_2O_5$ in 0 to 10 mol % (however, not including 0).

If outside this range of formulation, the above-mentioned effects can no longer sufficiently be obtained and the improvement in the TCR and STOL is liable to become insufficient.

Further, the glass composition of the present invention may contain, in addition to the above ingredients, another metal oxide. As the other metal oxide, $Al_2O_3$, ZnO, MgO, etc. may be mentioned. The content of the other metal oxide in the glass composition is preferably 20 mol % or less. If the content of the other metal oxide is above this range, the STOL characteristic is liable to be degraded.

Next, the thick-film resistor paste of the present invention will be explained. The thick-film resistor paste of the present invention includes a glass composition, conductive material, and in accordance with need an additive. These are mixed with an organic vehicle. As the glass composition, the above-mentioned glass composition is used. The glass composition, when made into a thick-film resistor, acts to bind the conductive material and additive in the thick-film resistor to the substrate.

The content of the glass composition in the resistor paste is preferably made 30 wt % to 70 wt % when the total weight of the glass composition, conductive material, and additive is 100 wt %, more preferably 35 wt % to 65 wt %. When the content of the glass composition in the resistor paste is lower than this range, the effect of binding of the conductive material and additive becomes insufficient and the reliability is liable to be remarkably reduced. Conversely, if the content of the glass composition is over the above range, the resistance value ends up becoming too high and the paste is liable to become unsuitable for use as a resistor paste.

The conductive material is dispersed in the insulator formed constituted by the glass and acts to impart conductivity to the structure of the thick-film resistor. The conductive material is not particularly limited, but for environmental protection, use of a conductive material substantially free of lead is preferable. As a specific conductive material substantially free of lead, in addition to an oxide of ruthenium, an Ag—Pd alloy, Ag—Pt alloy, TaN, WC, $LaB_6$, $MoSiO_2$, $TaSiO_2$, and metals (Ag, Au, Pt, Cu, Ni, W, Mo, etc.) may be mentioned. These substances may be used alone or in combinations of two or more types. Among these, an oxide of ruthenium is preferable. As the oxide of ruthenium, ruthenium oxide ($RuO_2$, $RuO_4$, etc.) and also a ruthenium-based pyrochlore ($Bi_2Ru_2O_7$, $Tl_2Ru_2O_7$, etc.) or a composite oxide of ruthenium ($SrRuO_3$, $BaRuO_3$, $CaRuO_3$, $LaRuO_3$, etc.) etc. are included. Among these, $RuO_2$, $CaRuO_3$, $SrRuO_3$, $BaRuO_3$, and $Bi_2Ru_2O_7$ are preferable.

The content of the conductive material in the resistor paste is preferably 5 wt % to 60 wt % when the total weight of the conductive material, glass composition, and additive is 100 wt %, more preferably 10 wt % to 55 wt %. If the content of the conductive material is too small, the resistance value ends up becoming too high and the paste is liable to become unsuitable for use as a resistor paste. Conversely, if the content of the conductive material is over that range, the binding of the conductive material by the glass composition becomes insufficient and the reliability is liable to fall.

The thick-film resistor paste may contain, in addition to the glass composition and conductive material, an additive for the purpose of adjusting the resistance value and temperature characteristic. As the additive, any metal oxide, metal composite oxide, metal material, etc. may be mentioned. These may be suitably selected for use.

As the metal composite oxide, $BaTiO_3$, $CaTiO_3$, $SrTiO_3$, $MgTiO_3$, $CoTiO_3$, $NiTiO_3$, etc. may be mentioned.

In particular, when using as the conductive material one or more oxide selected from $RuO_2$, $CaRuO_3$, $SrRuO_3$, $BaRuO_3$, and $Bi_2Ru_2O_7$, by combining both a metal composite oxide constituted by a titanate compound of an alkali earth metal and a metal material as additives, together with the effect of the glass composition, the TCR and/or STOL are greatly improved.

In this case, as the metal material, Ag, Pd, or another single metal, Ag—Pd, an alloy of Ag or Pd, or any other conductive metal in particle form may be used, but in particular if considering combination with the later explained titanate compounds, Ag is most preferable.

As the titanate compound of an alkali earth metal, $BaTiO_3$, $CaTiO_3$, $SrTiO_3$, etc. may be mentioned. These titanate compounds are preferably selected in accordance with the resistance value. Further, in this case, the formulations are preferably optimized.

As a specific resistor composition in a thick-film resistor paste for preparing a thick-film resistor with a resistance value of 1 kΩ/□ to 15 MΩ/□, a combination of a metal material constituted by Ag and a titanate compound of an alkali earth metal constituted by $BaTiO_3$ is preferable. The formulation of the resistor composition in this case is preferably the conductive material in an amount of 20 to 45 wt %, the glass composition in 30 to 60 wt %, the $BaTiO_3$ in 0 to 25 wt % (however, not including 0), and the metal material in 0 to 15 wt % (however, not including 0).

On the other hand, as the resistor compound in a thick-film resistor paste for preparing a thick-film resistor with a resistance value of 0.1 kΩ/□ to 5 MΩ/□, a combination of a metal material constituted by Ag and a titanate compound of an alkali earth metal constituted by $CaTiO_3$ or $SrTiO_3$ is preferable. The formulation of the resistor composition in this case is preferably the conductive material in an amount of 15 to 30 wt %, the glass composition in 50 to 65 wt %, one or more of the $CaTiO_3$ and $SrTiO_3$ in 0 to 15 wt % (however, not including 0), and the metal material in 0 to 20 wt % (however, not including 0).

The formulation of the resistor composition is determined considering not only the resistance value, but also the TCR and STOL. By adopting this range, it is possible to reliably realize small values of the TCR and STOL at different resistance values.

Note that simultaneous addition of the metal material and titanate compound of an alkali earth metal enables the TCR and STOL to be sufficiently improved even without using any other additive, but another additive may also be included in accordance with need. As the additive, any metal oxide may be mentioned, for example, MgO, $TiO_2$, $SnO_2$, ZnO, CoO, CuO, NiO, MnO, $MnO_4$, $Fe_2O_3$, $Cr_2O_3$, $Y_2O_3$, $V_2O_5$, etc. may be mentioned. In particular, by jointly using CuO, the STOL can be improved much more. For CuO, the optimum range differs depending on the desired resistance value. For a resistor composition for a thick-film resistor paste for preparing a thick-film resistor with a resistance value of 1 kΩ/□ to 15 MΩ/□, 0 to 8 wt % is preferable. For a resistor composition for a thick-film resistor paste for preparing a thick-film resistor with a resistance value of 0.1 kΩ/□ to 5 MΩ/□, 0 to 10 wt % is preferable.

The above-mentioned resistor composition is dispersed in an organic vehicle to make it into a thick-film resistor paste. As the organic vehicle for the thick-film resistor paste, any vehicle used for this type of thick-film resistor paste may be used. For example, ethyl cellulose, polyvinyl butyral, methacrylic resin, butyl methacrylate, or another binder resin and terpineol, butyl carbitol, butyl carbitol acetate, acetate, toluene, alcohols, xylene, and other solvents may be used mixed together. At this time, various types of dispersants or active agents, plasticizers, etc. may be suitably jointly used in accordance with the application etc.

Turning to the ratio of blending of the organic vehicle, the ratio (W2/W1) between the weight (W1) of the resistor composition and the weight (W2) of the organic vehicle is preferably 0.25 to 4 (W2:W1=1:0.25 to 1:4). More preferably, the ratio (W2/W1) is 0.5 to 2. If deviating from this ratio, it is liable to become unable to obtain a thick-film resistor paste of a viscosity suitable for forming a thick-film resistor on for example a substrate.

To form the thick-film resistor, a thick-film resistor paste including the above-mentioned ingredients may for example be printed (coated) on a substrate by screen printing or another technique and fired at a temperature of about 850° C. As the substrate, an $Al_2O_3$ substrate or $BaTiO_3$ substrate or other dielectric substrate, a low temperature fired ceramic substrate, an AlN substrate, etc. may be used. As the type of substrate, a single-layer substrate, composite substrate, or multilayer substrate may be used. In the case of a multilayer substrate, the thick-film resistor may be formed on the surface or may be formed inside. In the thick-film resistor formed, the formulation of the resistor composition included in the thick-film resistor paste is maintained substantially intact even after firing.

When forming the thick-film resistor, normally the substrate is formed with a conductor pattern for forming the electrodes. This conductor pattern may for example be formed by printing a conductive paste including an Ag-based good conductive material including Ag or Pt, Pd, etc. Further, the surface of the thick-film resistor formed may be formed with a glass coating or other protective coating (overglaze).

The electronic device using the thick-film resistor of the present invention is not particularly limited, but for example a single layer or multiple layer circuit board, chip resistor or other resistor, isolator device, C—R compound device, module device, etc. may be mentioned. Further, the invention may also be applied to an electrode part of a multilayer chip capacitor or other capacitor or an inductor etc.

EXAMPLES

Below, specific examples of the present invention will be explained based on experimental results.

<Preparation of Glass Composition>

As the glass materials, $CaCO_3$, $SrCO_3$, $BaCO_3$, $B_2O_3$, $SiO_2$, $ZrO_2$, $Ta_2O_5$, and $Nb_2O_5$ were used. In each example, predetermined ingredients were selected from these, weighed in predetermined amounts, charged into a platinum crucible, and heated at 1350° C. for 1 hour to melt. The melt was then poured into water to rapidly cool and glassify it. The obtained glassy substance was wet pulverized by a ball mill to obtain a glass composition powder. The formulation of each glass composition thus prepared is shown in Table 1. Note that in the formulations shown in Table 1, the numerical values indicate the percentages of the ingredients (mol %). The asterisks indicate values outside the range prescribed by the present invention.

<Preparation of Organic Vehicle>

Using ethyl cellulose as a binder and terpineol as an organic solvent, an organic vehicle was prepared by heating and stirring the organic solvent and dissolving the binder.

<Preparation of Thick-Film Resistor Paste>

A conductive material ($CaRuO_3$ powder), glass composition powder, additive, and the organic vehicle were weighed to give each formulation which was then kneaded by a triple roll mill to obtain a thick-film resistor paste. Note that the ratio of the total weight of the conductive material, glass composition powder, and additive and the weight of the organic vehicle was adjusted to a weight ratio of a range of 1:0.25 to 1:4 to prepare each resistor paste so that the obtained resistor paste had a viscosity suitable for screen printing.

<Preparation of Resistor>

A 96% purity alumina substrate was screen printed with an Ag—Pt conductor paste to a predetermined shape and then dried. The ratio of the Ag in the Ag—Pt conductor paste was 95 wt %, and the ratio of the Pt was 5 wt %. This alumina substrate was placed in a belt oven and fired by a one-hour

TABLE 1

| Glass no. | CaO, SrO, BaO | | | | | $B_2O_3$ | $SiO_2$ | $ZrO_2$ | $Ta_2O_5$ | $Nb_2O_5$ | Others | | | | |
|---|---|---|---|---|---|---|---|---|---|---|---|---|---|---|---|
| | Type | mol % | Type | mol % | Total | mol % | mol % | mol % | mol % | mol % | Type | mol % | Type | mol % | Total |
| 1 | CaO | 10 | | | *10 | 20 | 61 | 5 | 4 | | | | | | 0 |
| 2 | CaO | 50 | | | *50 | 20 | 23 | 5 | 2 | | | | | | 0 |
| 3 | CaO | 30 | | | 30 | *0 | 61 | 5 | 4 | | | | | | 0 |
| 4 | CaO | 25 | | | 25 | *45 | 20 | 5 | 5 | | | | | | 0 |
| 5 | CaO | 35 | | | 35 | 35 | *15 | 5 | 10 | | | | | | 0 |
| 6 | CaO | 35 | BaO | 2 | 37 | 19 | *15 | 5 | 4 | | $Al_2O_3$ | 10 | ZnO | 10 | 20 |
| 7 | CaO | 13 | | | 13 | 7 | *75 | 1 | 4 | | | | | | 0 |
| 8 | CaO | 16 | | | 16 | 7 | *72 | 1 | 4 | | | | | | 0 |
| 9 | CaO | 36 | | | 36 | 15 | 45 | *0 | 4 | | | | | | 0 |
| 10 | CaO | 25 | | | 25 | 15 | 45 | *12 | 3 | | | | | | 0 |
| 11 | CaO | 30 | | | 30 | 30 | 20 | *15 | 5 | | | | | | 0 |
| 12 | CaO | 35 | | | 35 | 35 | 25 | 5 | *0 | *0 | | | | | 0 |
| 13 | CaO | 35 | | | 35 | 15 | 45 | 5 | *0 | *0 | | | | | 0 |
| 14 | CaO | 30 | | | 30 | 30 | 20 | 5 | *15 | | | | | | 0 |
| 15 | CaO | 30 | | | 30 | 30 | 20 | 5 | | *15 | | | | | 0 |
| 16 | CaO | 15 | BaO | 4 | 19 | 15 | 40 | 1 | 4 | | $Al_2O_3$ | 11 | ZnO | 10 | *21 |
| 17 | CaO | 20 | | | 20 | 35 | 30 | 5 | 10 | | | | | | 0 |
| 18 | CaO | 40 | | | 40 | 30 | 20 | 5 | 5 | | | | | | 0 |
| 19 | CaO | 30 | | | 30 | 35 | 25 | 5 | 5 | | | | | | 0 |
| 20 | CaO | 40 | | | 40 | 20 | 25 | 5 | 10 | | | | | | 0 |
| 21 | CaO | 20 | | | 20 | 40 | 30 | 5 | 5 | | | | | | 0 |
| 22 | CaO | 40 | | | 40 | 25 | 20 | 5 | 10 | | | | | | 0 |
| 23 | CaO | 20 | | | 20 | 30 | 40 | 5 | 10 | | | | | | 0 |
| 24 | CaO | 35 | | | 35 | 34 | 25 | 5 | 1 | | | | | | 0 |
| 25 | CaO | 35 | | | 35 | 32 | 25 | 5 | 2 | | | | | | 0 |
| 26 | CaO | 35 | | | 35 | 30 | 25 | 5 | 5 | | | | | | 0 |
| 27 | CaO | 35 | | | 35 | 34 | 25 | 5 | | 1 | | | | | 0 |
| 28 | CaO | 35 | | | 35 | 32 | 25 | 5 | | 2 | | | | | 0 |
| 29 | CaO | 35 | | | 35 | 30 | 25 | 5 | | 5 | | | | | 0 |
| 30 | CaO | 35 | | | 35 | 30 | 25 | 5 | 2 | 3 | | | | | 0 |
| 31 | CaO | 20 | | | 20 | 35 | 30 | 5 | 5 | 5 | | | | | 0 |
| 32 | CaO | 11 | BaO | 2 | 13 | 15 | 46 | 10 | 4 | | MgO | 7 | ZnO | 5 | 12 |
| 33 | CaO | 35 | | | 35 | 15 | 41 | 5 | 4 | | | | | | 0 |
| 34 | CaO | 35 | SrO | 10 | 45 | 15 | 35 | 1 | 4 | | | | | | 0 |
| 35 | CaO | 30 | | | 30 | 1 | 60 | 5 | 4 | | | | | | 0 |
| 36 | CaO | 35 | | | 35 | 19 | 26 | 5 | 4 | | $Al_2O_3$ | 6 | ZnO | 5 | 11 |
| 37 | CaO | 35 | | | 35 | 19 | 17 | 5 | 4 | | $Al_2O_3$ | 10 | ZnO | 10 | 20 |
| 38 | CaO | 35 | | | 35 | 15 | 44.8 | 5 | 0.2 | | | | | | 0 |
| 39 | CaO | 35 | | | 35 | 15 | 41 | 5 | | 4 | | | | | 0 |
| 40 | CaO | 32 | | | 32 | 15 | 40 | 5 | 4 | 4 | | | | | 0 |
| 41 | CaO | 19 | | | 19 | 7 | 69 | 1 | 4 | | | | | | 0 |
| 42 | CaO | 20 | | | 20 | 35 | 30 | 5 | | 10 | | | | | 0 |
| 43 | SrO | 35 | | | 35 | 32 | 25 | 5 | 2 | | | | | | 0 |
| 44 | SrO | 35 | | | 35 | 32 | 25 | 5 | | 2 | | | | | 0 |
| 45 | BaO | 35 | | | 35 | 32 | 25 | 5 | 2 | | | | | | 0 |
| 46 | BaO | 35 | | | 35 | 32 | 25 | 5 | | 2 | | | | | 0 | pattern from insertion to discharge. The firing temperature at this time was 850° C., and the holding time at this temperature was 10 minutes.

The alumina substrate formed with the conductor in this way was coated with the previously prepared thick-film resistor paste by screen printing to a predetermined shape (1 mm×1 mm rectangle) of a pattern. After this, the thick-film resistor paste was fired under the same conditions as the firing of the conductor to obtain the thick-film resistor.

<Evaluation of Characteristics of Resistor>

(1) Resistance Value

Measured by a Product No. 34401A made by Agilent Technologies. Average value of 24 samples found.

(2) TCR

Rate of change in resistance value when changing the temperature from room temperature of 25° C. to −55° C. and 125° C. found. Average value of tens of samples. If designating the resistance values at −55° C., 25° C., and 125° C. as R-55, R25, and R125 (Ω/□), TCR (ppm/□)=[(R-55−R25)/R25/80]×1000000 or TCR (ppm/□)=[(R125−R25)/R25/100]×1000000. The larger of the two values is made the TCR value.

(3) STOL (Short Time Overload)

Rate of change in resistance value before and after applying test voltage to thick-film resistor for 5 seconds found. Average value of tens of samples. The test voltage was 2.5× rated voltage, and the rated voltage was $\sqrt{(R/4)}$, where R is the resistance value (Ω/□). For resistors with resistance values with calculated test voltages over 400V, the test voltage was made 400V.

<Study of Ingredients of Glass Composition>

The glass compositions shown in Table 1 were used to prepare thick-film resistors (Sample 1 to Sample 46). The characteristics of the thick-film resistors (resistance value, TCR, and STOL) were evaluated. When preparing the resistors, the formulations of the thick-film resistor pastes were made 25 wt % of the conductive material ($CaRuO_3$ powder) and 75 wt % of the glass composition. The results of the evaluation are shown in Table 2. Note that in Table 2, asterisked samples have formulations of the glass compositions outside the scope of the present invention and correspond to comparative examples.

TABLE 2

| Sample no. | Resistor | | |
|---|---|---|---|
| | R (Ω) | TCR (ppm/° C.) | STOL (%) |
| *1 | 9.2 M | ±180 | −1.95 |
| *2 | 5.9 M | ±240 | −2.19 |
| *3 | 12.5 M | ±625 | −0.40 |
| *4 | 3.1 M | ±870 | −9.40 |
| *5 | 3.8 M | ±701 | −6.90 |
| *6 | 850 k | ±85 | −6.65 |
| *7 | 6.6 M | ±165 | −1.64 |
| *8 | 5.4 M | ±152 | −1.06 |
| *9 | 2.1 M | ±110 | −10.80 |
| *10 | 8.2 M | ±523 | −0.84 |
| *11 | 8.4 M | ±732 | −7.90 |
| *12 | 1.1 M | ±490 | −3.20 |
| *13 | 920 k | ±370 | −5.10 |
| *14 | 4.5 M | ±600 | −6.20 |
| *15 | 7.2 M | ±503 | −5.20 |
| *16 | 790 k | ±110 | −4.95 |
| 17 | 6.2 M | ±140 | −0.33 |
| 18 | 4.1 M | ±139 | −0.20 |
| 19 | 4.2 M | ±132 | −0.31 |
| 20 | 5.2 M | ±119 | −0.29 |
| 21 | 3.2 M | ±110 | −0.22 |
| 22 | 8.3 M | ±100 | −0.36 |

TABLE 2-continued

| Sample no. | Resistor | | |
|---|---|---|---|
| | R (Ω) | TCR (ppm/° C.) | STOL (%) |
| 23 | 8.0 M | ±109 | −0.33 |
| 24 | 2.8 M | ±110 | −0.23 |
| 25 | 3.6 M | ±108 | −0.21 |
| 26 | 3.8 M | ±120 | −0.12 |
| 27 | 1.3 M | ±130 | −0.19 |
| 28 | 1.4 M | ±110 | −0.15 |
| 29 | 2.9 M | ±122 | −0.21 |
| 30 | 5.8 M | ±130 | −0.35 |
| 31 | 8.3 M | ±123 | −0.22 |
| 32 | 4.3 M | ±150 | −0.93 |
| 33 | 1.5 M | ±120 | −0.55 |
| 34 | 1.9 M | ±110 | −0.95 |
| 35 | 3.4 M | ±145 | −0.58 |
| 36 | 1.2 M | ±115 | −0.85 |
| 37 | 1.5 M | ±105 | −0.90 |
| 38 | 1.3 M | ±140 | −0.60 |
| 39 | 1.2 M | ±110 | −0.65 |
| 40 | 1.8 M | ±105 | −0.48 |
| 41 | 4.3 M | ±140 | −0.60 |
| 42 | 6.4 M | ±142 | −0.30 |
| 43 | 2.6 M | ±135 | −0.14 |
| 44 | 2.7 M | ±130 | −0.20 |
| 45 | 2.8 M | ±130 | −0.18 |
| 46 | 2.8 M | ±135 | −0.19 |

As clear from Table 2, in each of Sample 17 to Sample 46 having suitable formulations of glass compositions, the TCR was a small one of within ±150 ppm and the STOL was within ±1.0%. As opposed to this, in samples using glass compositions outside the scope of formulation prescribed by the present invention, the TCR greatly exceeded ±150 ppm, the STOL became large, or the characteristics otherwise became degraded.

<Study of Additives>

When preparing each thick-film resistor paste, the glass composition was selected from the CaO-Based glass compositions in Table 1. Further, as an additive, one selected from $BaTiO_3$, $CaTiO_3$, $SrTiO_3$, Ag, Pd, and CuO was used. The resistors (Sample 47 to Sample 62) were prepared in accordance with the description of the section on preparation of resistors.

The formulation of the resistor composition in each sample and the results of evaluation of its characteristics are shown in Table 3. Note that the numerical values in the table indicate the percentages (wt %) of the ingredients. It is learned that by adding a titanate compound and Ag, Pd, or another metal material and further CuO in combination, the TCR becomes within ±100 ppm and the STOL within ±0.5%, i.e., the characteristics are improved more.

TABLE 3

| Sample no. | Cond. Material Type | wt % | Glass comp. Glass no. | wt % | Additive① Type | wt % | Additive② Type | wt % | Additive③ Type | wt % | Resist. Ω | TCR ppm/°C. | STOL % |
|---|---|---|---|---|---|---|---|---|---|---|---|---|---|
| 47 | CaRuO₃ | 35 | 25 | 42 | CuO | 3 | BaTiO₃ | 15 | Ag | 5 | 3.0 M | ±55 | −0.11 |
| 48 | CaRuO₃ | 35 | 25 | 47 | CuO | 3 | BaTiO₃ | 15 | | | 1.8 M | ±108 | −0.09 |
| 49 | CaRuO₃ | 35 | 25 | 42 | CuO | 3 | CaTiO₃ | 15 | Ag | 5 | 605k | ±98 | −0.12 |
| 50 | CaRuO₃ | 35 | 25 | 42 | CuO | 3 | SrTiO₃ | 15 | Ag | 5 | 590k | ±89 | −0.22 |
| 51 | CaRuO₃ | 35 | 28 | 42 | CuO | 3 | BaTiO₃ | 15 | Ag | 5 | 2.2 M | ±70 | −0.08 |
| 52 | CaRuO₃ | 35 | 25 | 42 | CuO | 3 | BaTiO₃ | 15 | Pd | 5 | 4.1 M | ±70 | −0.14 |
| 53 | CaRuO₃ | 35 | 33 | 47 | CuO | 3 | BaTiO₃ | 15 | | | 2.1 M | ±110 | −0.33 |
| 54 | CaRuO₃ | 35 | 33 | 42 | CuO | 3 | BaTiO₃ | 15 | Ag | 5 | 5.5 M | ±90 | −0.10 |
| 55 | CaRuO₃ | 35 | 33 | 42 | CuO | 3 | CaTiO₃ | 15 | Ag | 5 | 920k | ±100 | −0.12 |
| 56 | CaRuO₃ | 35 | 33 | 42 | CuO | 3 | SrTiO₃ | 15 | Ag | 5 | 860k | ±95 | −0.20 |
| 57 | CaRuO₃ | 35 | 33 | 42 | CuO | 3 | BaTiO₃ | 15 | Pd | 5 | 6.1 M | ±100 | −0.25 |
| 58 | CaRuO₃ | 35 | 39 | 42 | CuO | 3 | BaTiO₃ | 15 | Ag | 5 | 1.2 M | ±80 | −0.09 |
| 59 | RuO₂ | 25 | 33 | 52 | CuO | 3 | BaTiO₃ | 15 | Ag | 5 | 520k | ±60 | −0.35 |
| 60 | BaRuO₃ | 35 | 33 | 42 | CuO | 3 | BaTiO₃ | 15 | Ag | 5 | 1.8 M | ±70 | −0.45 |
| 61 | SrRuO₃ | 35 | 33 | 42 | CuO | 3 | BaTiO₃ | 15 | Ag | 5 | 3.6 M | ±90 | −0.28 |
| 62 | Bi₂Ru₂O₇ | 30 | 33 | 47 | CuO | 3 | BaTiO₃ | 15 | Ag | 5 | 7.2 M | ±100 | −0.50 |

<Study of SrO-Based Glass Composition>

The SrO-based glass compositions shown in Table 1 were used to prepare thick-film resistors (Sample 63 to Sample 81). The characteristics of the thick-film resistors (resistance value, TCR, and STOL) were evaluated. When preparing the resistors, the formulations of the thick-film resistor pastes were as shown in Table 4. The results of the evaluation are shown together in Table 4.

<Study of BaO-Based Glass Composition>

The BaO-based glass compositions shown in Table 1 were used to prepare thick-film resistors (Sample 82 to Sample 87). The characteristics of the thick-film resistors (resistance value, TCR, and STOL) were evaluated. When preparing the resistors, the formulations of the thick-film resistor pastes were as shown in Table 5. The results of the evaluation are shown together in Table 5.

TABLE 4

| Sample no. | Cond. Material Type | wt % | Glass comp. Glass no. | wt % | Additive① Type | wt % | Additive② Type | wt % | Additive③ Type | wt % | Resist. Ω | TCR ppm/°C. | STOL % |
|---|---|---|---|---|---|---|---|---|---|---|---|---|---|
| 63 | CaRuO₃ | 35 | 43 | 42 | CuO | 3 | BaTiO₃ | 15 | Ag | 5 | 3.1 M | ±76 | −0.05 |
| 64 | CaRuO₃ | 35 | 43 | 47 | CuO | 3 | BaTiO₃ | 15 | | | 2.1 M | ±98 | −0.08 |
| 65 | CaRuO₃ | 35 | 43 | 42 | CuO | 3 | CaTiO₃ | 15 | Ag | 5 | 812k | ±54 | −0.10 |
| 66 | CaRuO₃ | 35 | 43 | 42 | CuO | 3 | SrTiO₃ | 15 | Ag | 5 | 600k | ±75 | −0.10 |
| 67 | CaRuO₃ | 35 | 44 | 42 | CuO | 3 | BaTiO₃ | 15 | Ag | 5 | 1.9 M | ±75 | −0.01 |
| 68 | CaRuO₃ | 35 | 44 | 42 | CuO | 3 | BaTiO₃ | 15 | Pd | 5 | 4.9 M | ±59 | −0.11 |
| 69 | CaRuO₃ | 35 | 44 | 42 | CuO | 3 | SrTiO₃ | 15 | Ag | 5 | 2.0 M | ±74 | −0.09 |
| 70 | SrRuO₃ | 35 | 43 | 42 | CuO | 3 | BaTiO₃ | 15 | Ag | 5 | 2.5 M | ±74 | −0.09 |
| 71 | SrRuO₃ | 35 | 43 | 47 | CuO | 3 | BaTiO₃ | 15 | | | 1.5 M | ±85 | −0.02 |
| 72 | SrRuO₃ | 35 | 43 | 42 | CuO | 3 | CaTiO₃ | 15 | Ag | 5 | 432k | ±101 | −0.12 |
| 73 | SrRuO₃ | 35 | 43 | 42 | CuO | 3 | SrTiO₃ | 15 | Ag | 5 | 683k | ±81 | −0.16 |
| 74 | SrRuO₃ | 35 | 44 | 42 | CuO | 3 | BaTiO₃ | 15 | Ag | 5 | 2.9 M | ±45 | −0.02 |
| 75 | SrRuO₃ | 35 | 44 | 42 | CuO | 3 | BaTiO₃ | 15 | Pd | 5 | 3.9 M | ±56 | −0.04 |
| 76 | SrRuO₃ | 35 | 44 | 42 | CuO | 3 | SrTiO₃ | 15 | Ag | 5 | 3.0 M | ±87 | −0.05 |
| 77 | RuO₂ | 35 | 43 | 42 | CuO | 3 | BaTiO₃ | 15 | Ag | 5 | 2.3k | ±94 | −0.08 |
| 78 | BaRuO₃ | 35 | 43 | 42 | CuO | 3 | BaTiO₃ | 15 | Ag | 5 | 4.2 M | ±95 | −0.08 |
| 79 | Bi₂Ru₂O₇ | 35 | 43 | 42 | CuO | 3 | BaTiO₃ | 15 | Ag | 5 | 10.5 M | ±80 | −0.04 |
| 80 | CaRuO₃ | 35 | 43 | 42 | CuO | 0 | SrTiO₃ | 15 | Ag | 5 | 955k | ±98 | −0.18 |
| 81 | CaRuO₃ | 35 | 43 | 42 | CuO | 8 | SrTiO₃ | 15 | Ag | 5 | 306k | ±80 | −0.09 |

TABLE 5

| Sample no. | Cond. Material Type | wt % | Glass comp. Glass no. | wt % | Additive① Type | wt % | Additive② Type | wt % | Additive③ Type | wt % | Resist. Ω | TCR ppm/° C. | STOL % |
|---|---|---|---|---|---|---|---|---|---|---|---|---|---|
| 82 | $CaRuO_3$ | 35 | 45 | 42 | CuO | 3 | $BaTiO_3$ | 15 | Ag | 5 | 3.6 M | ±60 | −0.14 |
| 83 | $RuO_2$ | 35 | 45 | 42 | CuO | 3 | $BaTiO_3$ | 15 | Ag | 5 | 608k | ±74 | −0.33 |
| 84 | $BaRuO_3$ | 35 | 45 | 42 | CuO | 3 | $BaTiO_3$ | 15 | Ag | 5 | 4.0 M | ±70 | −0.20 |
| 85 | $SrRuO_3$ | 35 | 45 | 42 | CuO | 3 | $BaTiO_3$ | 15 | Ag | 5 | 3.4 M | ±69 | −0.20 |
| 86 | $Bi_2Ru_2O_7$ | 35 | 45 | 42 | CuO | 3 | $BaTiO_3$ | 15 | Ag | 5 | 8.5 M | ±70 | −0.20 |
| 87 | $CaRuO_3$ | 35 | 45 | 42 | CuO | 0 | $BaTiO_3$ | 15 | Ag | 5 | 5.9 M | ±84 | −0.29 |

As clear from Table 4 and 5, it was learned that even when using the SrO-Based glass compositions and the CaO-Based glass compositions shown in Table 1, by adding a titanate compound and Ag, Pd, or another metal material and further CuO in combination, the TCR was generally within ±100 ppm and the STOL was within ±0.5%, that is, greater improvement was achieved.

While the invention has been described with reference to specific embodiments chosen for purpose of illustration, it should be apparent that numerous modifications could be made thereto by those skilled in the art without departing from the basic concept and scope of the invention.

The invention claimed is:

1. A thick-film resistor paste including at least a glass composition, a conductive material, $BaTiO_3$ and a metal material with which an organic vehicle is mixed, wherein;
    said conductive material is at least one oxide selected from $RuO_2$, $Bi_2Ru_2O_7$, $CaRuO_3$, $SrRuO_3$, and $BaRuO_3$,
    said metal material is at least one material selected from Ag, Pd, and Ag—Pd, and
    said glass composition comprising:
        at least one oxide selected from CaG, SrO, and BaO: 13 mol % to 45 mol %,
        $B_2O_3$: more than 0 to 40 mol %,
        $SiO_2$: 17 mol % to less than 72 mol %,
        $ZrO_2$: more than 0 to 10 mol %, and
        at least one oxide selected from $Ta_2O_5$ and $Nb_2O_5$: 1 to 10 mol %.

2. The thick-film resistor paste as set forth in claim 1, furthermore containing as an additive at least one additive selected from metal oxides.

3. The thick-film resistor paste as set forth in claim 2, wherein said metal oxide is CuO.

4. A thick-film resistor formed using a thick-film resistor paste as set forth in claim 1.

5. The thick-film resistor as set forth in claim 4, wherein the resistance value is 1 kΩ/□ or more.

6. An electronic device containing a thick-film resistor as set forth in claim 4.

7. An electronic device containing a thick-film resistor as set forth in claim 5.

* * * * *